US008676136B2

(12) United States Patent
Voinigescu et al.

(10) Patent No.: US 8,676,136 B2
(45) Date of Patent: Mar. 18, 2014

(54) RADIO ANTENNA SWITCH

(75) Inventors: Sorin Voinigescu, Toronto (CA);
Alexander Tomkins, Toronto (CA);
Andreea Balteanu, Toronto (CA);
Ioannis Sarkas, Toronto (CA); Katya Laskin, Thornhill (CA)

(73) Assignee: Peraso Technologies, Inc., Toronto, ON (CA)

( * ) Notice: Subject to any disclaimer, the term of this patent is extended or adjusted under 35 U.S.C. 154(b) by 191 days.

(21) Appl. No.: 13/357,827

(22) Filed: Jan. 25, 2012

(65) Prior Publication Data

US 2012/0190312 A1 Jul. 26, 2012

Related U.S. Application Data

(60) Provisional application No. 61/436,375, filed on Jan. 26, 2011.

(51) Int. Cl.
*H03C 7/02* (2006.01)

(52) U.S. Cl.
USPC .............................. 455/101; 340/12.5; 455/78

(58) Field of Classification Search
USPC ....................... 455/101, 91, 130, 78; 340/12.5
See application file for complete search history.

(56) References Cited

U.S. PATENT DOCUMENTS

| 5,550,554 | A | | 8/1996 | Erkocevic | |
|---|---|---|---|---|---|
| 6,006,117 | A | * | 12/1999 | Hageltorn et al. | 455/575.7 |
| 6,021,317 | A | * | 2/2000 | Irvin | 455/78 |
| 2005/0107043 | A1 | * | 5/2005 | Avasarala et al. | 455/78 |
| 2005/0231367 | A1 | | 10/2005 | Bellantoni | |
| 2009/0061715 | A1 | * | 3/2009 | Evans | 442/301 |
| 2010/0022197 | A1 | * | 1/2010 | Kato et al. | 455/75 |
| 2012/0215092 | A1 | * | 8/2012 | Harris et al. | 600/410 |

OTHER PUBLICATIONS

Zwick et al., Broadband Planar Superstrate Antenna for Integrated Millimeterwave Transceivers, IEEE Transactions on Antennas and Propagation, vol. 54, No. 10, pp. 2790-2796, Oct. 2006.
PCT Patent Application No. PCT/CA2012/000072, International Search Report mailed Apr. 19, 2012, 8 pgs.

* cited by examiner

*Primary Examiner* — Creighton Smith (57) ABSTRACT

A radio antenna switch module for a high frequency radio transceiver enables the radio transceiver to have a small number of receivers and transmitters and a larger number of antennas, whereby each antenna has a different diversity characteristic. The diversity between antennas provide for greater communication reliability, while the small number of receivers and transmitters allows the transceiver to operate at relatively low power compared to conventional radio transceivers. The switch module also allows for two loopback modes between the transmitter and the receiver for at-speed, low-cost self-test in production.

22 Claims, 5 Drawing Sheets

RADIO ANTENNA SWITCH

CROSS-REFERENCE TO RELATED APPLICATION

The present application is a non-provisional of U.S. Provisional Application No. 61/436,375, entitled "HIGH-FREQUENCY RADIO TRANSCEIVER," filed on Jan. 26, 2011, the entirety of which is herein incorporated by reference.

BACKGROUND

1. Field of the Disclosure

The present disclosure generally relates to radio antenna switches, and more particularly to radio antenna switches for use in high-frequency radio transceivers.

2. Description of the Related Art

Information is frequently transferred between electronic devices wirelessly via radio signals that encode the information. Wireless communication has typically employed relatively low-frequency bands, such as the 2.4 GHz band and the 5 GHz band. Due to limited spectrum at these bands, it can be difficult to communicate large volumes of information at a high rate. Accordingly, higher frequency bands having greater spectrum have been employed for some wireless transfer devices. However, conventional transceivers can be undesirable for high-frequency communication due to high power consumption.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate a radio transceiver and techniques associated therewith. The radio transceiver device employs a switching module to allow the radio transceiver to have a small number of receivers and transmitters and a larger number of antennas, whereby each antenna has a different diversity characteristic. The diversity between antennas provides for greater communication quality, while the small number of receivers and transmitters allows the transceiver to operate at relatively low power compared to conventional radio transceivers.

To illustrate, the radio transceiver can be connected to a device interface, such as a USB controller, to provide for wireless communication between a computer and a peripheral. As the device interface transmits and receives information via the radio transceiver, a processing module can determine whether a different configuration of the switch module is likely to result in improved quality of communication. For example, the processing module can determine that a selected antenna of the two or more antennas has a diversity characteristic that is likely to result in more reliable communication and, in response, connect both the receiver and the transmitter to the selected antenna. The processing module can alter the antennas connected to each receiver and transmitter over time to maintain communication quality.

Figure 1:
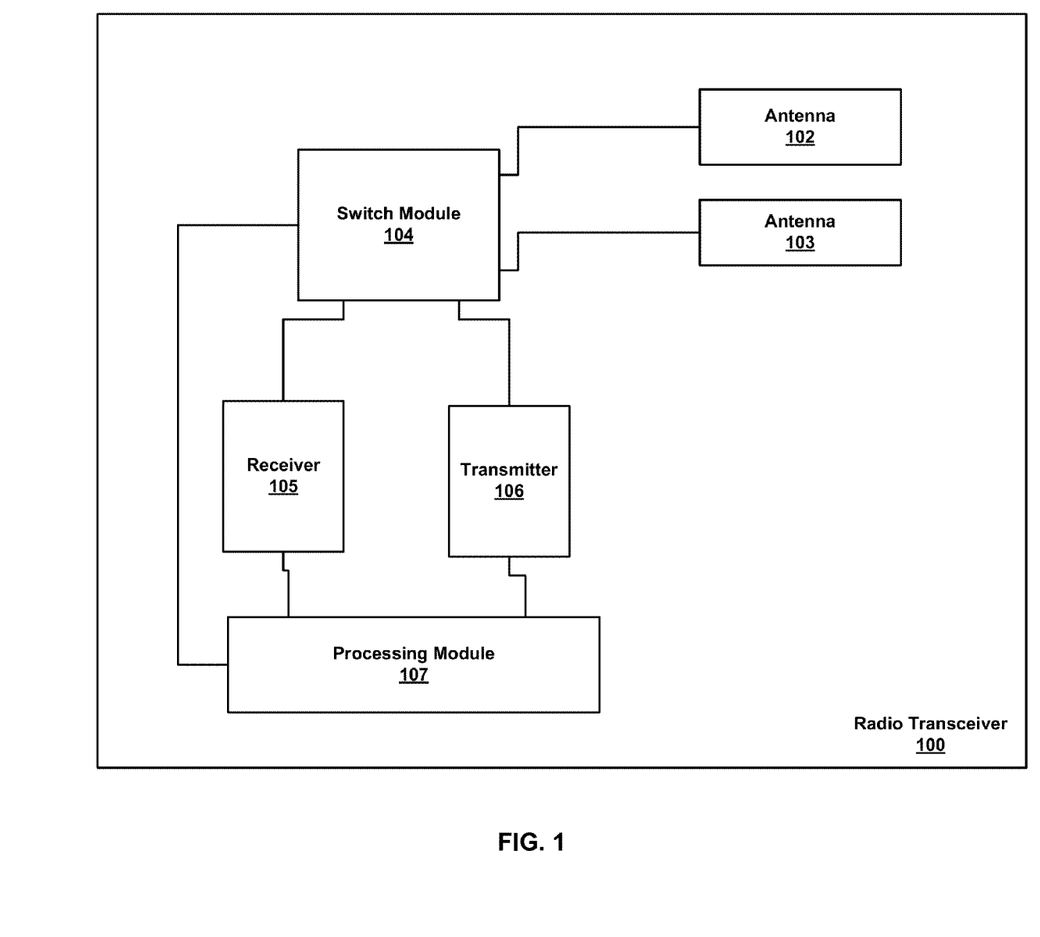
FIG. 1 is block diagram illustrating a radio transceiver according to one embodiment of the present disclosure.

FIG. 1 illustrates a block diagram of a radio transceiver 100 according to one embodiment of the present disclosure. Radio transceiver 100 is generally configured to receive and communicate radio signals having information encoded in a carrier wave via frequency modulation. The radio transceiver 100 processes received radio signals to tune the transceiver to a designated frequency band associated with the center frequency of the carrier wave and extracts the encoded information from the carrier wave. Further, radio transceiver 100 can receive information from an interface device, encode the information into a modulated radio signal (e.g. a phase modulated radio signal), and transmit the radio signal. In an embodiment, the radio transceiver 100 is configured to receive and communicate information via the millimeter wave spectrum, such as the 60 GHz spectrum.

Radio transceiver 100 includes antennas 102 and 103, a switch module 104, a receiver 105, a transmitter 106, and a processing module 107. Each of the antennas 102 and 103, the receiver 105, and the transmitter 106 are connected to terminals of the switch module 104. Switch module 104 also includes an input to receive control information. Processing module 107 includes input/output ports connected to receiver 105 and transmitter 106, and an output to provide the control information to the switch module 104.

The antennas 102 and 103 are transducers operable to receive and transmit electromagnetic waves. To illustrate, in one embodiment the antennas 102 and 103 are patch antennas formed on a substrate, whereby each antenna is connected to a microstrip patch transmission line (not shown in FIG. 1) to carry received radio signals and radio signals to be transmitted. Each of the antennas 102 and 103 is associated with different diversity characteristics. As used herein, a diversity characteristic is a characteristic of an antenna that differentiates the antenna for radio signal transmission or reception with respect to other antennas of the transceiver. Examples of diversity characteristics include polarization, whereby each antenna has a different polarity, frequency diversity, whereby each antenna is associated with a different resonant frequency, and spatial diversity, whereby each antenna is associated with a different spatial orientation.

The switch module 104 includes multiple switches that are set based on received control information to set the connectivity between terminals of the module. The switches can be individually set such that any terminal of the switch module 104 can be connected to or disconnected from any other terminal. As used herein, the terms connected and disconnected refer to electrical connection and disconnection, and are dependent on the amount of electrical energy that can be communicated between the terminals. Thus, it will be appreciated that, in some embodiments, a terminal can be disconnected from another terminal by placing a transmission line between the terminals in a high-impedance state. Accordingly, terminals can be electrically disconnected from each other even if a physical connection between the terminals remains. A particular configuration of the switching module 104 to connected selected terminals is referred to herein as a mode of operation for the radio transceiver 100.

Receiver 105 is a module configured to tune received signals to a designated frequency spectrum. Accordingly, receiver 105 includes one or more filters (not shown) that filter received electromagnetic signals to separate a radio signal at the frequency of interest. Receiver 105 can perform additional operations on the separated radio signal, such as amplification, conversion of the analog radio signal to a digital signal, decoding of the information encoded in the radio signal, and the like.

Transmitter 106 includes one or more modules to amplify a radio signal for transmission via an antenna. Transmitter 106 can include additional modules to process the radio signal for transmission. For example, transmitter 106 can include an oscillator and modulator to encode received information into the carrier wave associated with the radio signal via frequency modulation.

Processing module 107 is a data processing device configured to process information communicated to or from the radio transceiver 100. Accordingly, processing module 107 can be a general purpose or application specific data processor, a set of logic modules to implement a state machine, or other processing device that controls information processing for the radio transceiver 100. In particular, processing module 107 can extract information from received radio signals and convert the received information to a format sufficient for communication to a device interface. To illustrate, radio transceiver 100 can be incorporated in a wireless Universal Serial Bus interface that communicates information wirelessly to and from a USB controller. The processing module 107 can place information received via the radio signal in a format appropriate for communication to the USB controller. Further, processing module 107 is configured to process information received from the device interface to a format for encoding in a radio signal.

In addition, processing module 107 is configured to control the mode of operation for the switch module 104 based on a number of criteria. The first criterion used to select the mode is based on whether the radio transceiver is to transmit or receive radio signals. In addition, the processing module 104 can select the mode of operation to select the one of the antennas 102 and 103 that is expected to result in the highest reliability of radio signal communication. To illustrate, the switch module 104 can be selectively placed in at least four different modes, such that in each mode a different one of the receiver 105 and the transmitter 106 is connected to a different one of the antennas 102 and 103. Thus, in a first mode of operation the switch module 104 is configured such that the antenna 102 is connected to the transmitter 106, whereby radio signals are communicated from the transmitter 106 to the antenna 102. In the first mode the switch module 104 is configured such that radio signals are prevented from being communicated to or from the antenna 103, and are prevented from being communicated to the receiver 105.

In a second mode of operation the switch module 104 is configured such that the antenna 103 is connected to the transmitter 106, whereby radio signals are communicated from the transmitter 106 to the antenna 103. In the second mode of operation radio signals are prevented from communication to or from the antenna 102, and are prevented from being communicated to the receiver 105.

In a third mode of operation the switch module 104 is configured such that the antenna 102 is connected to the receiver 105 for communication of received radio signals. In the third mode of operation radio signals are prevented from communication to or from the antenna 103, and are prevented from being communicated by the transmitter 106.

In a fourth mode of operation the switch module 104 is configured such that the antenna 103 is connected to the receiver 105 for communication of received radio signals. In the fourth mode of operation radio signals are prevented from communication to or from the antenna 102, and are prevented from being communicated by the transmitter 106.

The processing module 107 sets the mode of operation for the switch module 104 based on whether the radio transceiver 100 is communicating or receiving information, and on which antenna is expected to provide for greater reliability for communication of the information. To illustrate, when the radio transceiver 100 is communicating information, the processing module 107 will place the switch module 104 in either the first mode or the second mode so that information can be transmitted via the transmitter 106. The processing module 107 can select the first mode or the second mode based on characteristics associated with transmitting the information, whereby the characteristics indicate the expected reliability of reception of the information at a target device. For example, the processing module 107 can set the switch module 104 to the first mode, transmit information to the target device, and determine whether the target device is receiving the transmitted information at a designated fidelity. This determination can be made based on, for example, whether the radio transceiver 100 receives acknowledgement information from the target device. If the acknowledgement information is not received, the processor 107 can set the mode of the switch module 104 to the second mode and continue transmission of the information. Because antennas 102 and 103 have different diversity characteristics, the transmission characteristics of the transmitted radio signal will be different. By switching the mode of the switch module 104, the processing module 107 can attempt to improve transmission fidelity by selecting the antenna having the diversity characteristic better suited for reliable transmission according to the particular operating conditions of the radio transceiver 100. Moreover, because the operating conditions of the radio transceiver 100, such as the position of the radio transceiver 100, the ambient characteristics of the transmission medium, and the like can vary over time, the processing module 107 can switch back and forth between the first mode and the second mode based on periodic determinations of the transmission fidelity in order to select the antenna that provides the better expected transmission reliability at different points in time.

Similarly, when receiving information, the processing module 107 can select between the third mode and the fourth mode according to the quality of the radio signal at the frequency of interest. The quality can be determined based on characteristics of the radio signal, such as signal to noise ratio, based on the characteristics of information decoded from the radio signal, and the like. Further, the processing module 107 can switch back and forth between the third mode and the fourth mode based on periodic determinations of the received radio signal quality in order to select the antenna that provides the better quality at different points in time.

Accordingly, as set forth above, the antennas 102 and 103 are selected for transmission or reception based on the diversity characteristics that provide the better reception or transmission quality. Employment of the switch module 104 allows for a single transmitter to be used for transmission, and a single receiver used for reception, via different antennas at different points in time. This allows the radio transceiver 100 to be smaller and consume less power than conventional systems that employ a dedicated transmitter and receiver for each antenna in an antenna array. In an embodiment, total power consumption by the radio transceiver is less than 500 milliwatts. In another embodiment, total power consumption by the radio transceiver is less than 350 milliwatts.

In an embodiment, the processor 107 can place the switch module 104 in one or more loopback modes, such that each of the antennas are commonly connected to either the receiver 105 or the transmitter 106. In another loopback mode, the processing module 107 can configure the switch module so that the transmitter 106 and the receiver 105 are connected together. In another loopback mode, all of the terminals of the switch module are coupled together, such that the transmitter 106 is connected to the receiver 105 with at least 23 dB of signal attenuation. The loopback modes can be employed by the processing module 107 during testing of the radio transceiver 100.

It will be appreciated in embodiments other than the example illustrated at FIG. 1, the radio transceiver 100 can include more than two antennas, whereby the switch module 104 can connect any antenna to either of the receiver 105 and transmitter 106 according to the mode of operation, in similar fashion as described above.

In an embodiment the switch module 104, the receiver 105, and the transmitter 106 are fabricated on a common substrate. In an embodiment, the antennas 102 and 103 are both formed on a substrate that forms a package for the substrate of the switch module 104, the receiver 105, and the transmitter 106.

Figure 2:
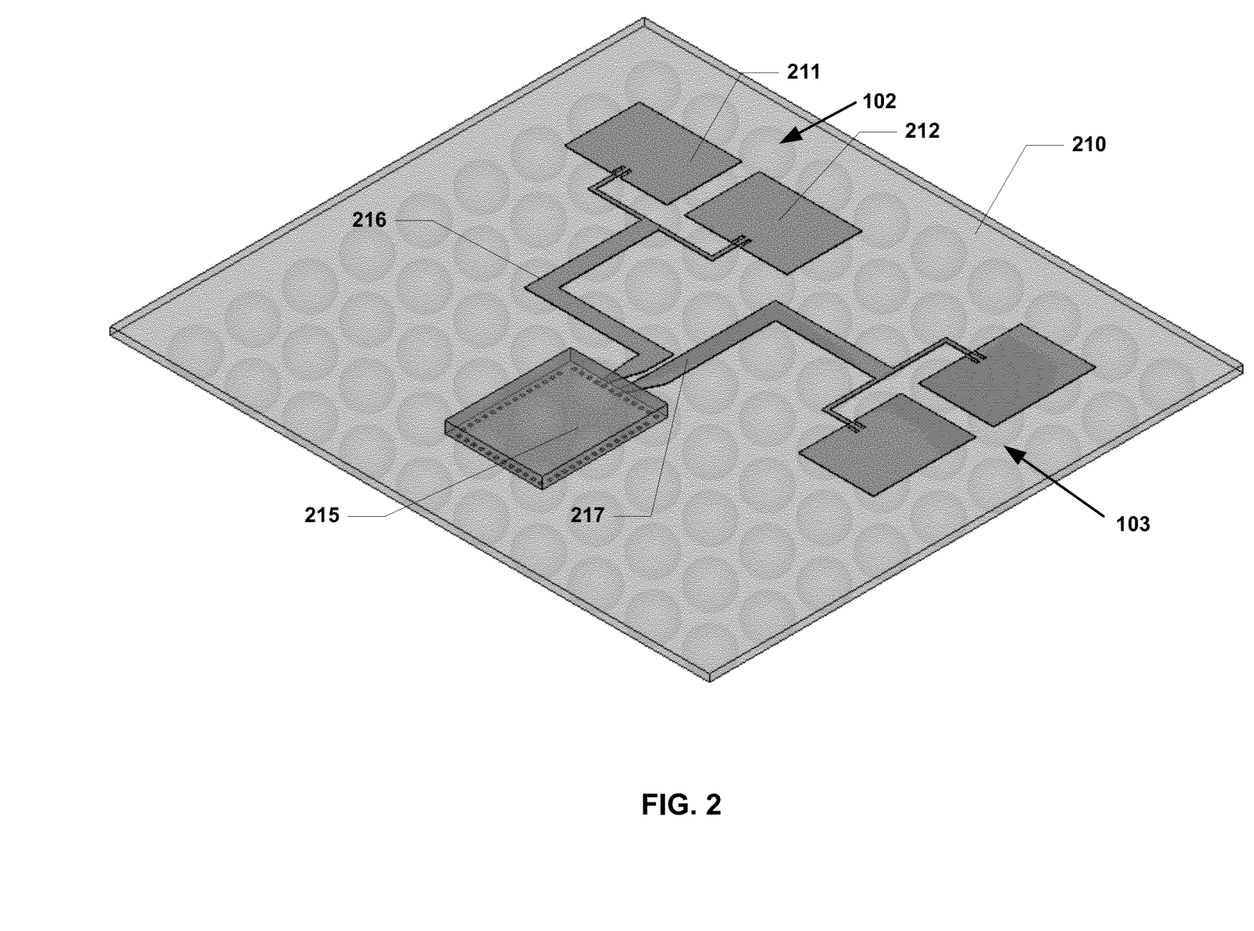
FIG. 2 is a diagram of a particular embodiment of an integrated circuit package for the radio transceiver of FIG. 1.

Referring to FIG. 2, an integrated circuit package 200 associated with the radio transceiver 100 is illustrated in accordance with one embodiment of the present disclosure. The integrated circuit package 200 includes a substrate 210, a die 215, and antennas 102 and 103. In the illustrated embodiment, the antennas 102 and 103 are patch antennas each have two patches. Thus, for example, antenna 102 includes a patch 211 and a patch 212. Antenna 102 is connected to die 215 via a microstrip feeder 216, while antenna 217 is connected to the die 215 via a microstrip feeder 217.

Die 215 is a semiconductor die which forms the modules of the radio transceiver 100, such as the switch module 104, the receiver 105, the transmitter 106, and the processing module 107. In an embodiment, the die 215 is mounted in a flip-chip fashion on the substrate 210. The substrate 210 is 13 mm by 13 mm, and has a thickness of 25 mil, excluding the die 215. In an embodiment, the total size of the integrated circuit package 200, including the antennas is approximately 1.3 centimeters by 1.3 centimeters by 1 millimeter.

In the illustrated embodiment of FIG. 2, the antennas 102 and 103 are arranged such that antenna 103 is oriented at 90 degrees with respect to antenna 102. Antennas 102 and 103 are therefore orthogonally polarized with respect to each other. In other embodiments, additional antennas can be employed whereby each antenna has a different polarization or geometry.

Figure 3:
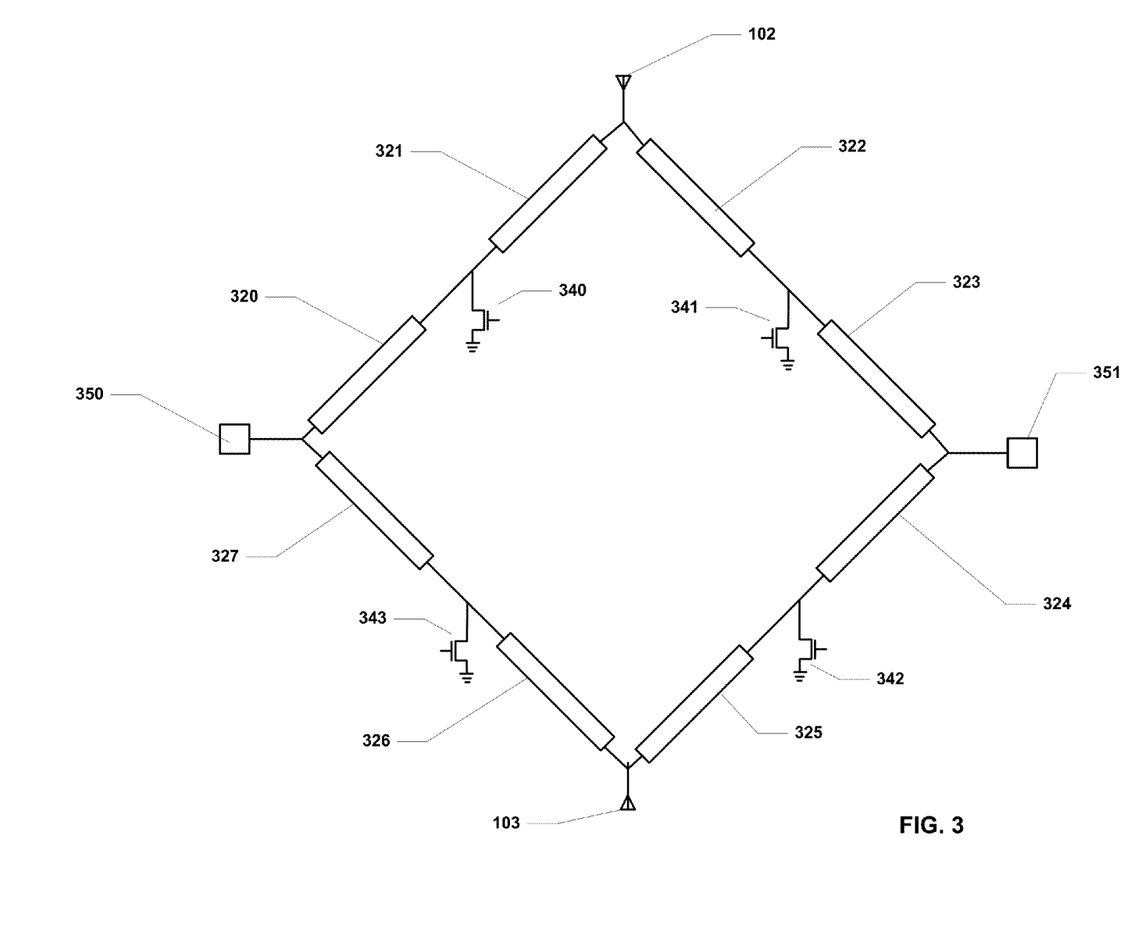
FIG. 3 is a circuit diagram of a particular embodiment of the switch module of FIG. 1.

FIG. 3 illustrates a particular of the switch module 104 of FIG. 1. In the illustrated embodiment, switch module includes quarter-wavelength transmission line segments 320-327 transistors 340-343, and ports 350 and 351. Port 350 is connected to the input of receiver 105 and port 351 is connected to the output of transmitter 106. Transmission line segment 320 includes a first terminal connected to port 350 and a second terminal. Transmission line segment 321 includes a first terminal connected to the second terminal of transmission line segment 320 and a second terminal connected to the antenna 102. Transmission line segment 322 includes a first terminal connected to the antenna 102 and a second terminal. Transmission line segment 323 includes a first terminal connected to the second terminal of transmission line segment 322 and a second terminal connected to the port 351. Transmission line segment 324 includes a first terminal connected to port 351 and a second terminal. Transmission line segment 325 includes a first terminal connected to the second terminal of transmission line segment 324 and a second terminal connected to the antenna 103. Transmission line segment 326 includes a first terminal connected to the antenna 103 and a second terminal. Transmission line segment 327 includes a first terminal connected to the second terminal of transmission line segment 326 and a second terminal connected to the port 350.

Transistor 340 includes a first current electrode connected to the second terminal of transmission line segment 320, a second current electrode connected to a ground voltage reference, and a control electrode. Transistor 341 includes a first current electrode connected to the second terminal of transmission line segment 322, a second current electrode connected to the ground voltage reference, and a control electrode. Transistor 342 includes a first current electrode connected to the second terminal of transmission line segment 324, a second current electrode connected to the ground voltage reference, and a control electrode. Transistor 343 includes a first current electrode connected to the second terminal of transmission line segment 326, a second current electrode connected to the ground voltage reference, and a control electrode.

Each of the transmission line segments 320-327 is a quarter of the wavelength of the carrier of the radio signals communicated to and from the radio transceiver 100. In operation, the control terminals of the transistors 340-343 are individually controlled based on the control information provided by the processor module 107. By employing the control information to set the conductivity of each of the transistors 340-343, the processor 107 can set the switch module 104 to connect any of the ports 350 and 351, and the antennas 102 and 103, to any antenna or port.

To illustrate, by application of a switching voltage at the control terminal of the transistor 140 causes the transistor to become conductive, thereby effectively shorting the second terminal of the transmission line segment 320 to the ground reference. In response, transmission line segments 320 and 321 provide a relatively high impedance. In contrast, if the switching voltage is not provided to the control electrode of the transistor 340, transmission line segments 320 and 321 will provide a relatively low impedance, such that radio signals can be communicated between antenna 102 and port 350. Accordingly, by applying the switching voltage to selected ones of the transistors 340-343, the processing module 107 can selectively route the radio signals between the ports 350 and 351 and the antennas 102 and 103.

In an embodiment, transistors 340-343 are CMOS transistors, and the frequency associated with the radio signals being transferred over the switching module 104 is 60 GHz. Accordingly, switching module 104 employs relatively small transistors for communication of high frequency signals as compared to conventional approaches that use larger switching elements and configurations.

Figure 4:
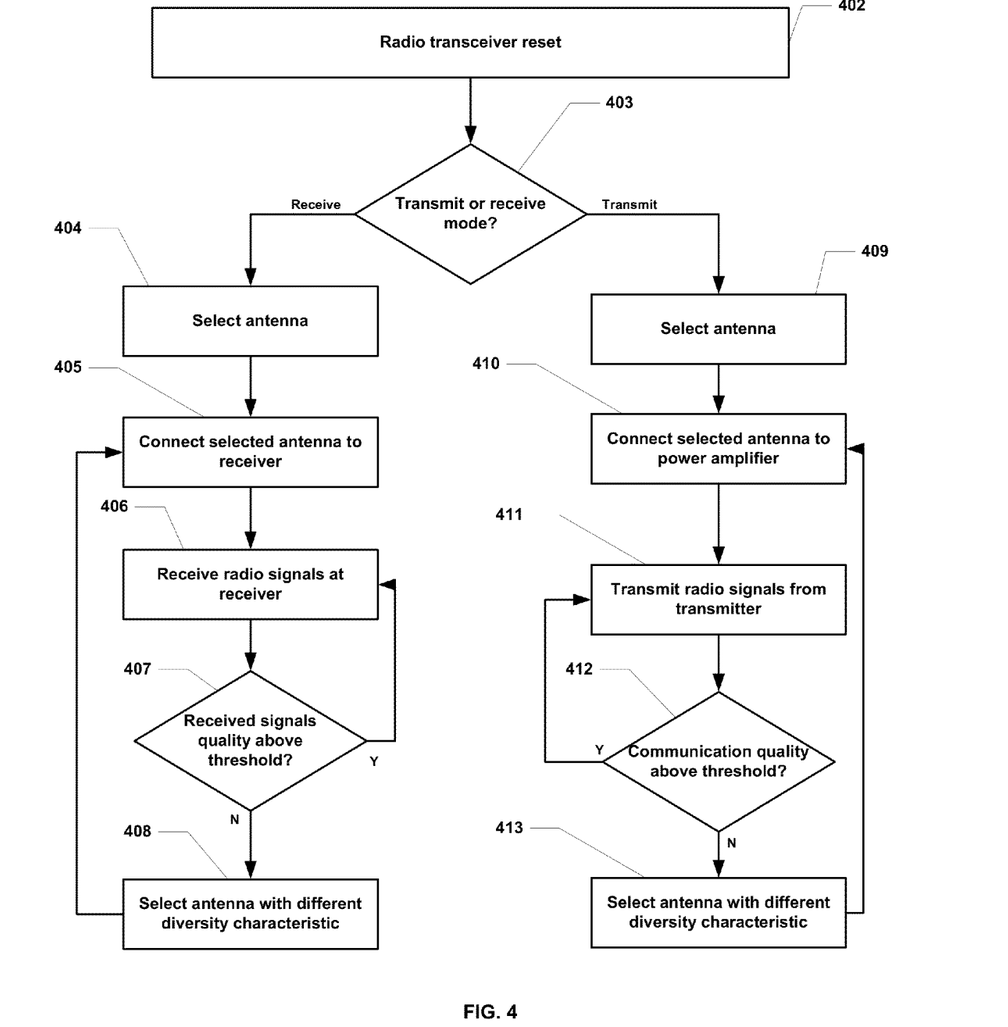
FIG. 4 is a flow diagram of a method of controlling the switch module of FIG. 1 in accordance with one embodiment of the present disclosure.

Referring to FIG. 4, a flow diagram of a method of controlling the radio transceiver 100 in accordance with one of the present disclosure. At block 402, the radio transceiver 100 is reset. At block 404, the radio transceiver determines whether information is to be received or transmitted. This determination can be made based on information received from an interface device connected to the radio transceiver 100. If the radio transceiver determines that information is to be received, the method proceeds to block 404 and the processing module 107 selects one of the antennae 102 and 103. The antenna can be selected based on fixed initialization information, or can be dynamically selected according to the current operating conditions of the radio transceiver 100. At block 405, the processing module 107 controls the switch module 104 to connect the selected antenna to the receiver 105. At block 406 radio signals are received at the receiver 105 via the selected antenna and the switch module 104. At block 407 the processing module 107 determines whether the quality of the received radio signals are above a quality threshold, such a signal to noise ratio threshold. If the quality of the received radio signals is above the threshold, the method returns to block 406. If the quality of the received radio is are below the threshold, the method proceeds to block 408 and the processing module 107 selects a different antenna having a different diversity characteristic. The method flow returns to block 405 so that the selected antenna can be connected to the receiver 104.

Returning to block 403, if the radio transceiver determines that information is to be transmitted, the method moves to block 409 and the processing module 107 selects one of the antennae 102 and 103. At block 410, the processing module 107 controls the switch module 104 to connect the selected antenna to the transmitter 106. At block 411 radio signals are transmitted by the transmitter 106 via the selected antenna and the switch module 104. At block 412 the processing module 107 determines whether the quality of communication for the information associated with the transmitted radio signals is above a quality threshold. This determination can be based on feedback information received from the target of the transmitted radio signals. If the communication quality for the transmitted radio signals is above the threshold, the method returns to block 411. If the communication quality for the transmitted radio signals is below the threshold, the method proceeds to block 413 and the processing module 107 selects a different antenna having a different diversity characteristic. The method flow returns to block 410 so that the selected antenna can be connected to the receiver 104.

Figure 5:
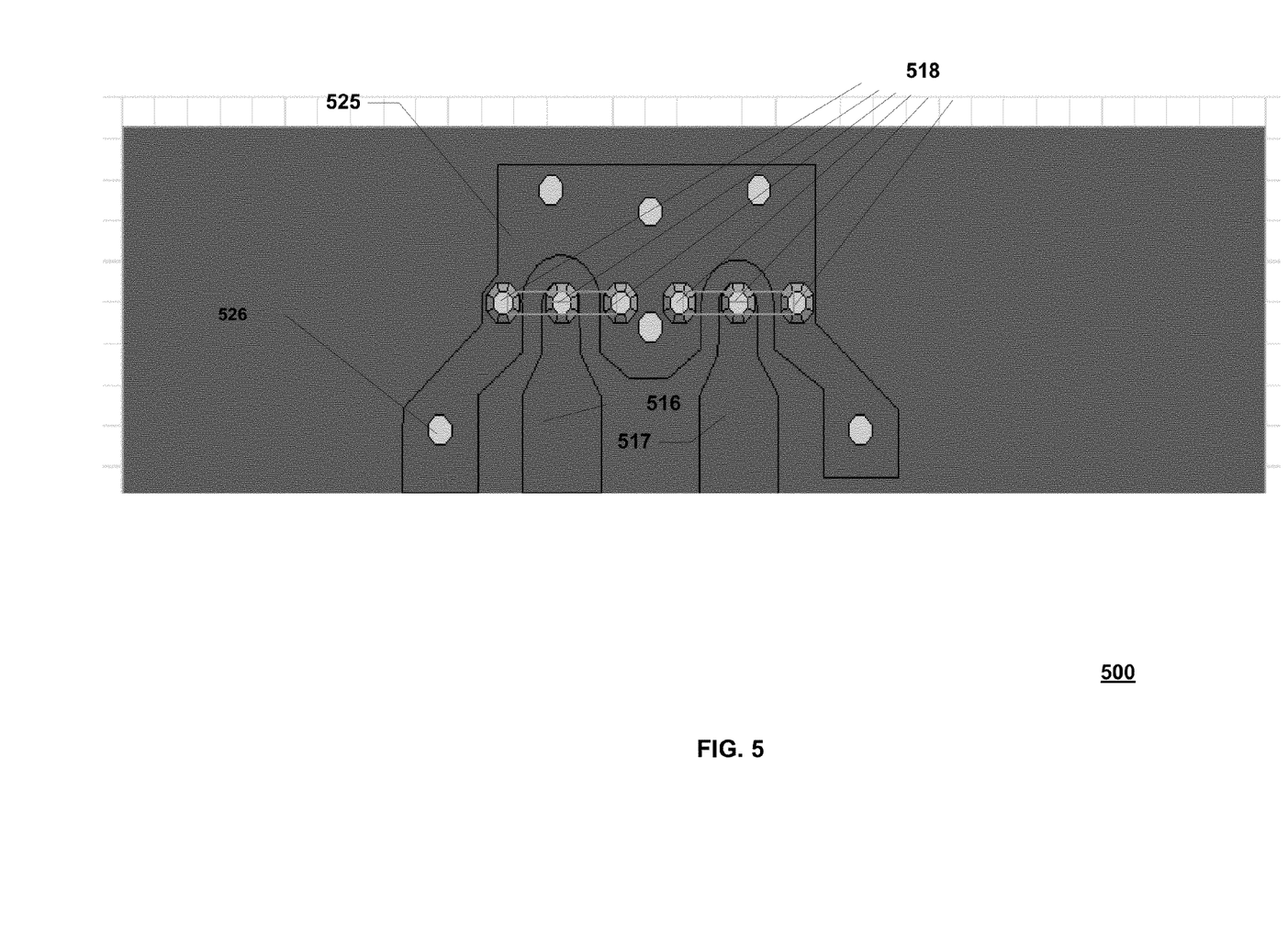
FIG. 5 is a diagram of a portion of an integrated circuit package including co-planar waveguide (CPW) to microstrip transition in accordance with one embodiment of the present disclosure.

FIG. 5 illustrates a diagram of a portion 500 of an integrated circuit package including co-planar waveguide (CPW) to microstrip transition in accordance with one embodiment of the present disclosure. The portion 500 includes a metal layer that includes microstrip lines 516 and 517, corresponding to microstrip feeders 216 and 217 of FIG. 2, a ground structure 525, die interconnects such as bump structures 518, and connections to a ground plane, such as connection 526. The layout of the transition is based on a difference between the CPW metal line width on the die 215 (FIG. 2) and the microstrip metal line on the substrate 210 (FIG. 2). In particular, the lines for both the die 215 and the substrate 210 are 50 ohm lines, but the width of the lines on the die (SiO2 dielectric) is on the order of microns while the width of lines used on the substrate (using a dielectric that is based on the antenna requirements) is on the order of hundreds of microns. Because of the difference in widths, there is a narrowing of the substrate metal line in the bumping region where the transition between die and substrate is located. In addition, the metallurgical interfaces between metal lines on the die and solder bumps, the interface between the solder bumps and the metal line on the substrate, as well as the uncontrolled shape of the solder bumps can contribute to signal reflection and active power loss.

In an embodiment, the overall dimensions of the transition 500 are 1500 micrometers by 750 micrometers. In this embodiment, dimensions of individual features of the transition are limited by a minimum design rule of 2 mils (approximately 50 micrometers) for both metal space and width. Tolerance is 10 micrometers or better. It will be appreciated that the materials that impact the layout of the transition 500 are the first dielectric laminate of the substrate (dielectric constant, thickness), die top dielectric performances, top metal line thickness (both die and substrate), bump material and shape after final reflow, and the like. Based on a bump pad pitch (the distance between the bump structures on either side of the microstrip 516) of 180 um (micrometers), both the CPW transmission lines on die and the microstrip feeder lines 516 and 517 have a pitch of 540 um. To implement the CPW to microstrip transition the microstrip line width is gradually reduced to 130 um with a spacing of 50 um. The shape of the ground plate in the transition region is designed to minimize the reflections induced by the local alteration of the characteristic impedance of the microstrip lines and the inclusion of the bumps. Further, the distance between the microstrips 516 and 571 is 250 micrometers and the distance between the microstrip 516 and the metal ground plane at the edge near connection 526 is 50 micrometers. The distance between the solder bump at the end of the microstrip 516 and the metal ground plane 525, where the metal ground plane curves around the bump is also 50 um. The bump pad at the top of the microstrip line extends to the edge of the line (the opening in the solder mask that defines the pad completely exposes the metal line below). In the reflow process, the solder material will wet the entire exposed metal region.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A device comprising:
 a first antenna having a first diversity characteristic;
 a second antenna having a second diversity characteristic different from the first diversity characteristic;
 a transmitter comprising an output to transmit a radio frequency signal;
 a receiver comprising an input to receive a radio frequency signal;
 a switch module coupled to the first antenna, the second antenna, the transmitter, and the receiver, the switch module comprising a select input to receive information indicating an operating mode, the switch module configured to:
  in response to the information indicating the mode of operation is a first mode, couple the first antenna to the transmitter, prevent signals from being communicated from the first antenna to the receiver, and prevent signals from being communicated to the transmitter or to the receiver from the second antenna;

in response to the information indicating the mode of operation is a second mode, couple the second antenna to the transmitter, prevent signals from being communicated from the second antenna to the receiver, and prevent signals from being communicated to the transmitter or to the receiver from the first antenna;

in response to the information indicating the mode of operation is a third mode, couple the first antenna to the receiver, prevent signals from being communicated from the transmitter to the first antenna, and prevent signals from being communicated from the second antenna to the transmitter or to the receiver; and in response to the information indicating the mode of operation is a fourth mode, couple the second antenna to the receiver, prevent signals from being communicated from the transmitter to the second antenna, and prevent signals from being communicated from the first antenna to the transmitter or to the receiver.

2. The device of claim 1, wherein the switch module, the receiver, and the transmitter are formed on a common first substrate.

3. The device of claim 2, wherein the first antenna and the second antenna are formed on a second substrate that forms a package for the first substrate.

4. The device of claim 1, wherein the first diversity characteristic comprises a first polarization and the second diversity characteristic comprises a second polarization.

5. The device of claim 1, wherein the first polarization is orthogonal to the second polarization.

6. The device of claim 1, wherein the first diversity characteristic comprises a first resonant frequency and the second diversity characteristic comprises a second resonant frequency.

7. The device of claim 1, wherein the first diversity characteristic comprises a first spatial position and the second diversity characteristic comprises a second position.

8. The device of claim 1, wherein the first and second antennae are patch antennas.

9. The device of claim 8, wherein the first and second antennae each comprise two patches.

10. The device of claim 1, wherein the switch module is further configured to:
in response to the information indicating the mode of operation is a fifth mode, connecting the transmitter to the receiver to communicate a transmit signal through the switch.

11. The device of claim 10, wherein the switch module is further configured to:
in response to the information indicating the mode of operation is a sixth mode, couple each switch terminal of the switch module together such that the transmitter is connected to the receiver with at least 23 dB of signal attenuation.

12. The device of claim 11, wherein the switch module is further configured to:
in response to the information indicating the mode of operation is a seventh mode, connect the first antenna to the transmitter and to the second antenna.

13. The device of claim 1, wherein the switch module is to receive and provide signals at approximately 60 GHz, and the switch module comprises a plurality of switch segments, each of the plurality of switch segments comprising:
a first transmission line segment;
a second transmission line segment coupled to the first transmission line segment;
a first transistor comprising a first current electrode coupled to the first transmission line segment and the second transmission line segment, a second current electrode coupled to a voltage reference, and a control electrode to receive a control signal.

14. The device of claim 13, wherein the plurality of switch segments comprises:
a first switch segment coupled between the transmitter and the first antenna;
a second switch segment coupled between the transmitter and the second antenna;
a third switch segment coupled between the receiver and the first antenna; and
a fourth switch segment coupled between the receiver and the second antenna.

15. The device of claim 1, wherein the first transmission line segment and the second transmission line segment each have an approximate length of a quarter of the wavelength of the approximately 60 GHz signal.

16. The device of claim 1, further comprising an integrated circuit package, and the transmitter is the only transmitter associated with the antennas in the integrated circuit package.

17. The device of claim 1, further comprising an integrated circuit package, and wherein the first antenna and the second antenna are formed on the top of the package and the transceiver is flip-chip mounted on the same surface of the package.

18. A method, comprising:
receiving information indicating a mode of operation of a radio transceiver;
in response to the information indicating the mode of operation is a first mode, coupling a first antenna having a first diversity characteristic to a transmitter, preventing signals from being communicated from the first antenna to a receiver, and preventing signals from being communicated to the transmitter or to the receiver from a second antenna having a second diversity characteristic;
in response to the information indicating the mode of operation is a second mode, coupling the second antenna to the transmitter, preventing signal from being communicated from the second antenna to the receiver, and preventing signals from being communicated to the transmitter or to the receiver from the first antenna;
in response to the information indicating the mode of operation is a third mode, coupling the first antenna to the receiver, preventing signals from being communicated from the transmitter to the first antenna, and preventing signals from being communicated from the second antenna to the transmitter or to the receiver; and
in response to the information indicating the mode of operation is a fourth mode, coupling the second antenna to the receiver, preventing signals from being communicated from the transmitter to the second antenna, and preventing signals from being communicated from the first antenna to the transmitter or to the receiver.

19. The method of claim 18, further comprising:
setting the mode of operation of the radio transceiver to a first selected mode at a first time;
in response to determining a quality of communication with a remote device is below a threshold, changing the mode of operation of the radio transceiver to a second selected mode.

20. The method of claim 17, wherein the first diversity characteristic comprises a first polarity and the second diversity characteristic comprises a second polarity.

21. The method of claim 17, wherein the first diversity characteristic comprises a first resonant frequency and the second diversity characteristic comprises a second resonant frequency.

22. The method of claim 17, wherein the first diversity characteristic comprises a first spatial position and the second diversity characteristic comprises a second position.

* * * * *